US011896161B2

(12) United States Patent
Eaton et al.

(10) Patent No.: US 11,896,161 B2
(45) Date of Patent: Feb. 13, 2024

(54) IMPLEMENT ATTACHMENT HOLDER FOR A HAND MIXER

(71) Applicant: WHIRLPOOL CORPORATION, Benton Harbor, MI (US)

(72) Inventors: Christopher J. Eaton, Stevensville, MI (US); Patrick David Feltman, Paw Paw, MI (US); Jon Patrick Morris, Anna, OH (US); Nicholas Hill Schutte, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 233 days.

(21) Appl. No.: 17/467,715

(22) Filed: Sep. 7, 2021

(65) Prior Publication Data
US 2023/0070677 A1 Mar. 9, 2023

(51) Int. Cl.
*A47J 43/07* (2006.01)
*A47J 43/044* (2006.01)
*A47J 43/06* (2006.01)
*B01F 27/13* (2022.01)
*B01F 33/501* (2022.01)
*B01F 101/06* (2022.01)
*B01F 101/08* (2022.01)

(52) U.S. Cl.
CPC ......... *A47J 43/0705* (2013.01); *A47J 43/044* (2013.01); *A47J 43/06* (2013.01); *B01F 27/13* (2022.01); *B01F 33/5011* (2022.01); *A47J 2043/04418* (2013.01); *B01F 2101/06* (2022.01); *B01F 2101/08* (2022.01)

(58) Field of Classification Search
CPC ...... A47J 43/0705; A47J 43/044; A47J 43/06; A47J 2043/04418; B01F 33/5011
USPC ......................................................... 366/129
See application file for complete search history.

(56) References Cited

U.S. PATENT DOCUMENTS

| 3,064,951 | A | | 11/1962 | Fillweber | |
|---|---|---|---|---|---|
| 3,482,893 | A | | 12/1969 | Butsch | |
| 3,552,879 | A | | 1/1971 | Sparks | |
| 3,758,183 | A | * | 9/1973 | Steinkamp | A47B 77/08 312/292 |
| 4,575,255 | A | * | 3/1986 | Kafka | H02J 7/0042 366/601 |
| 5,979,850 | A | * | 11/1999 | Hippen | A47J 43/0705 D7/412 |

(Continued)

FOREIGN PATENT DOCUMENTS

GB 2345650 B 7/2000

*Primary Examiner* — Marc C Howell
(74) *Attorney, Agent, or Firm* — Price Heneveld LLP

(57) ABSTRACT

An implement attachment holder for a hand mixer includes a body defining opposed first and second surfaces and first and second mounting projections coupled with the body and extending away from the first surface of the body at respective first and second locations spaced apart at a first distance along a first direction. The attachment holder further includes a device retention projection extending away from the second surface of the body and partially along the first surface to at least partially overlie the first and second locations from which the first and second mounting projections extend. The device retention projection further defines at least three attachment channels extending in a second direction normal to the first direction at spaced-apart locations along the device retention projection.

20 Claims, 8 Drawing Sheets

(56) References Cited

U.S. PATENT DOCUMENTS

| | | | |
|---|---|---|---|
| D577,546 S | * | 9/2008 | Ferraby .......................... D7/412 |
| D579,271 S | * | 10/2008 | Ferraby .......................... D7/412 |
| D654,303 S | * | 2/2012 | Nordwall ........................ D7/378 |
| 8,550,692 B1 | | 10/2013 | Brown et al. |
| 8,746,957 B2 | | 6/2014 | Garman et al. |

* cited by examiner

IMPLEMENT ATTACHMENT HOLDER FOR A HAND MIXER

BACKGROUND OF THE DISCLOSURE

The present disclosure generally relates to an attachment holder for a hand mixer, and more specifically, to an attachment holder that mounts to a face of the hand mixer and retains a plurality of implement attachments therewith.

SUMMARY OF THE DISCLOSURE

According to one aspect of the present disclosure, an implement attachment holder for a hand mixer includes a body defining opposed first and second surfaces and first and second mounting projections coupled with the body and extending away from the first surface of the body at respective first and second locations spaced apart at a first distance along a first direction. The attachment holder further includes a device retention projection extending away from the second surface of the body and partially along the first surface to at least partially overlie the first and second locations from which the first and second mounting projections extend. The device retention projection further defines at least three attachment channels extending in a second direction normal to the first direction at spaced-apart locations along the device retention projection. The attachment channels are open on a face of the device retention projection and on first and second parallel long sides of the device retention projection that extend between the face and the second surface of the body.

According to another aspect of the present disclosure, a kit includes a hand mixer having first and second attachment hubs exposed at a face of the hand mixer and at least three implement attachments selectively connectable with the first and second attachment hubs. The kit further includes an implement attachment holder having a body defining opposed first and second surfaces and first and second mounting projections coupled with the body and extending away from the first surface of the body at respective first and second locations spaced apart at a first distance along a first direction configured for engagement with respective first and second attachment hubs of the hand mixer to retain the attachment holder on the hand mixer. The attachment holder further has a device retention projection extending away from the second surface of the body and partially along the first surface. The device retention projection further defines at least three attachment channels extending in a second direction normal to the first direction at spaced-apart locations along the device retention projection. The attachment channels are open on a face of the device retention projection and on first and second parallel long sides of the device retention projection that extend between the face and the second surface of the body. The attachment channels are configured to receive three of the at least three implement attachments when not engaged with the first or second attachment hubs for retention with the hand mixer by engagement of the first and second mounting projections with the first and second attachment hubs.

According to yet another aspect of the present disclosure, a method for operating a hand mixer can include removing an implement attachment holder from the hand mixer by removing first and second mounting projections coupled with a body of the attachment holder and extending away from a first surface of the body from engagement with respective first and second attachment hubs of the hand mixer. The implement attachment holder can define at least three attachment channels extending in a second direction normal to the first direction at spaced-apart locations along a mounting projection and respectively retaining at least three implement attachments selectively connectable with the first and second attachment hubs. The method can further include removing at least one of the implement attachments from the implement attachment holder and assembling the at least one of the implement attachments with at least the first attachment hub of the hand mixer.

These and other features, advantages, and objects of the present disclosure will be further understood and appreciated by those skilled in the art by reference to the following specification, claims, and appended drawings.

Figure 1:
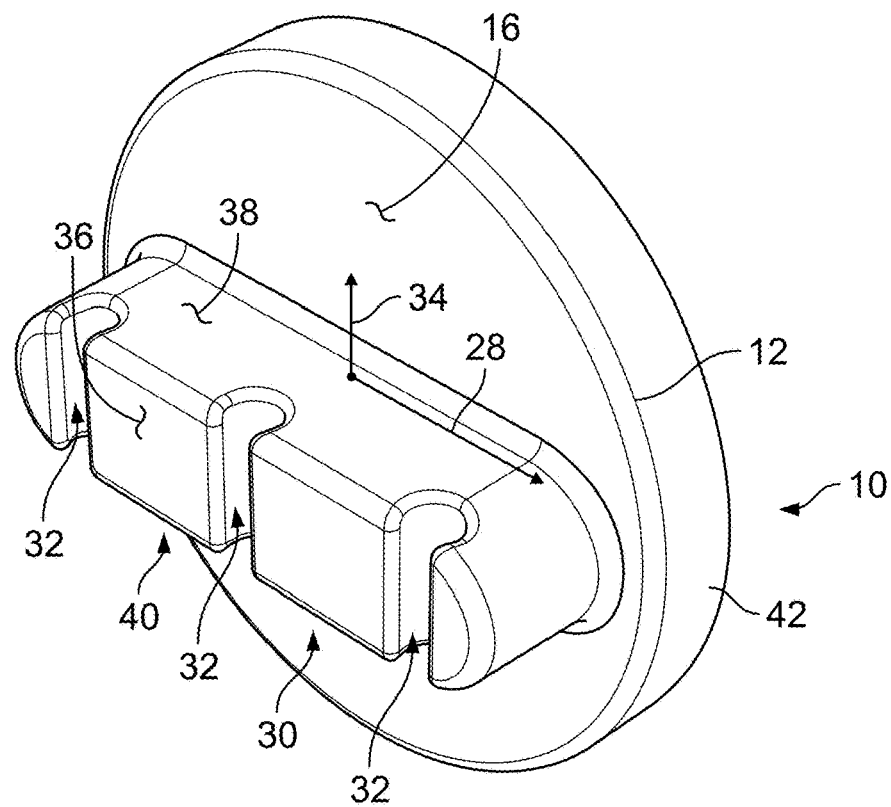
FIG. 1 is a front perspective view of an attachment holder according to an aspect of the disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an attachment holder for a hand mixer. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
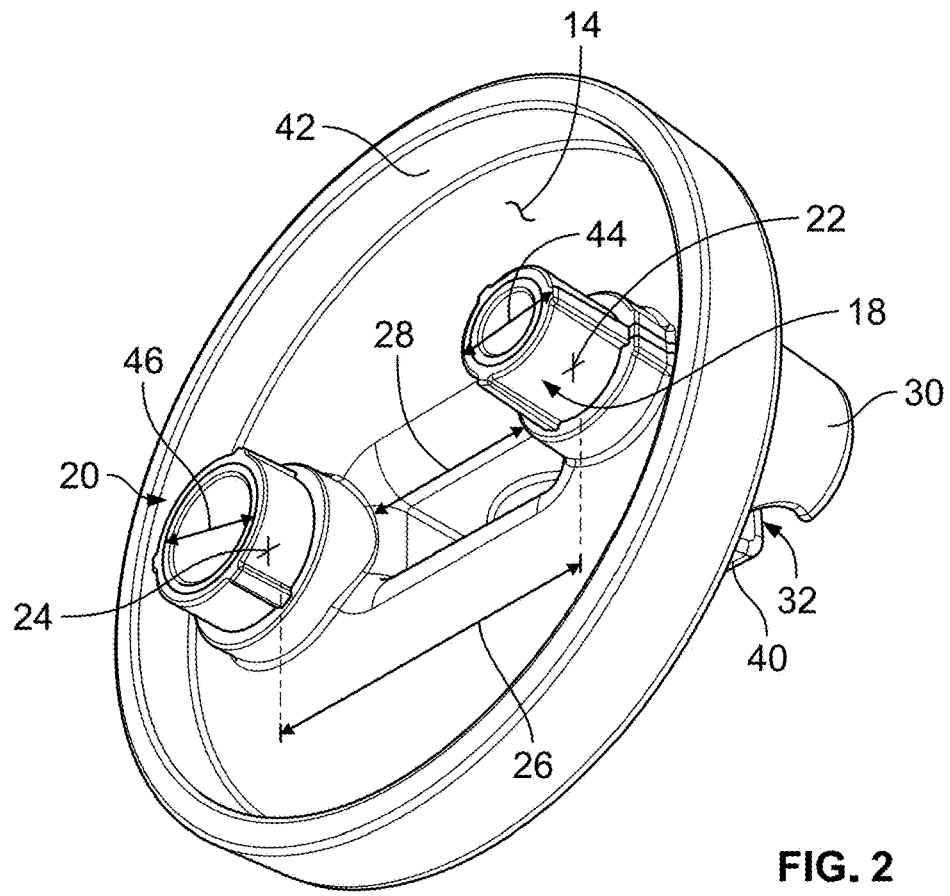
FIG. 2 is a back perspective view of the attachment holder.

Referring to FIGS. 1-10, reference numeral 10 generally designates an implement attachment holder for a hand mixer 80. As shown in FIGS. 1 and 2, the attachment holder 10 includes a body 12 defining opposed first and second surfaces 14,16 and first and second mounting projections 18,20 coupled with the body 12 and extending away from the first surface 14 of the body 12 at respective first and second locations 22,24 spaced apart at a first distance 26 along a first direction 28. The attachment holder 10 further includes a device retention projection 30 extending away from the second surface 16 of the body 12 and partially along the second surface 16 to at least partially overlie the first and second locations 22,24 from which the first and second mounting projections 18,20 extend. The device retention projection 30 further defines at least three attachment channels 32 extending in a second direction 34 normal to the first direction 28 at spaced-apart locations along the device retention projection 30. The attachment channels 32 are open on a face 36 of the device retention projection 30 and on first and second parallel long sides 38,40 of the device retention projection 30 that extend between the face 36 and the second surface 16 of the body 12.

Figure 3:
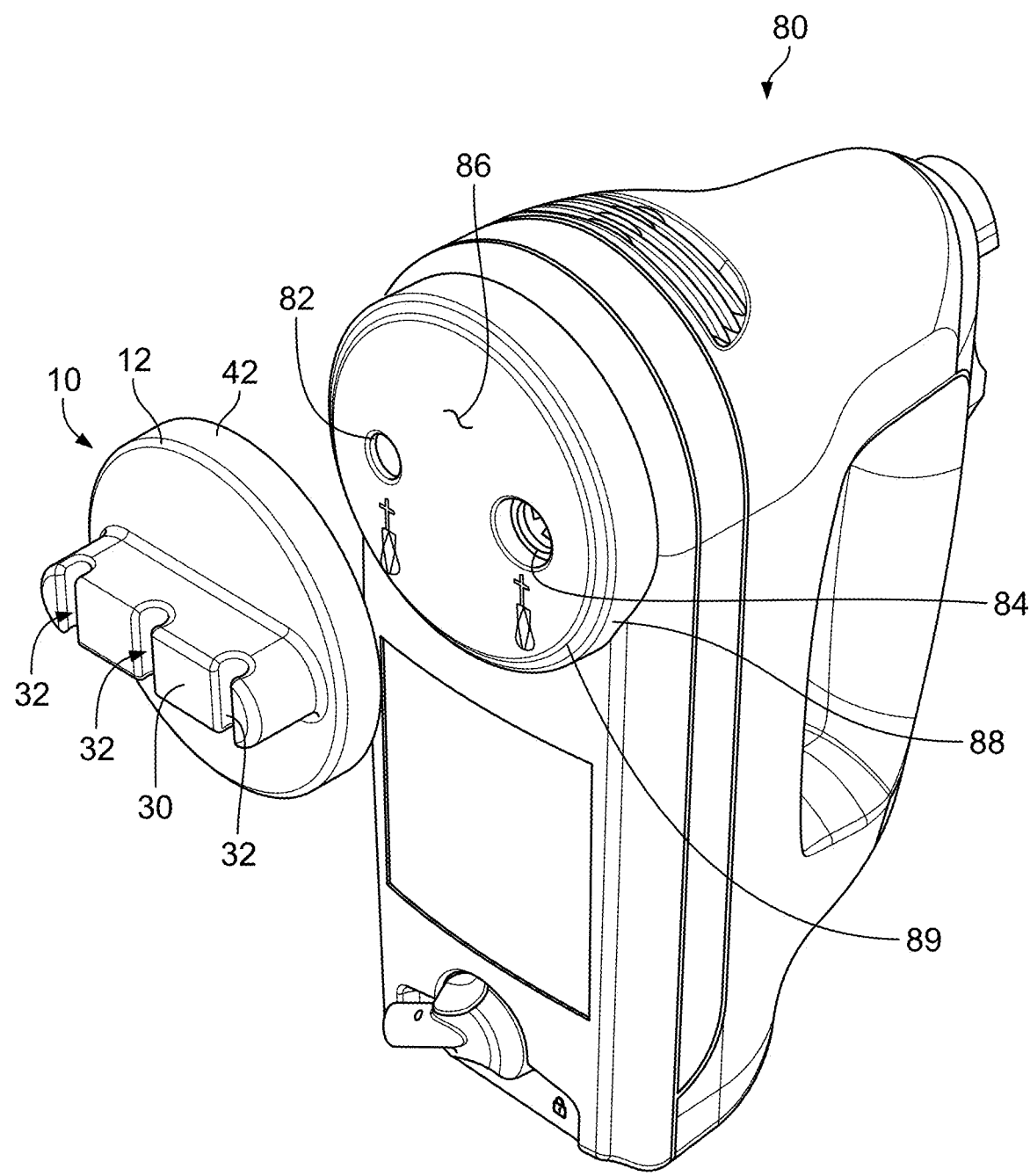
FIG. 3 is a front perspective assembly view showing alignment of the attachment holder for mounting on a hand mixer.
Figure 4:
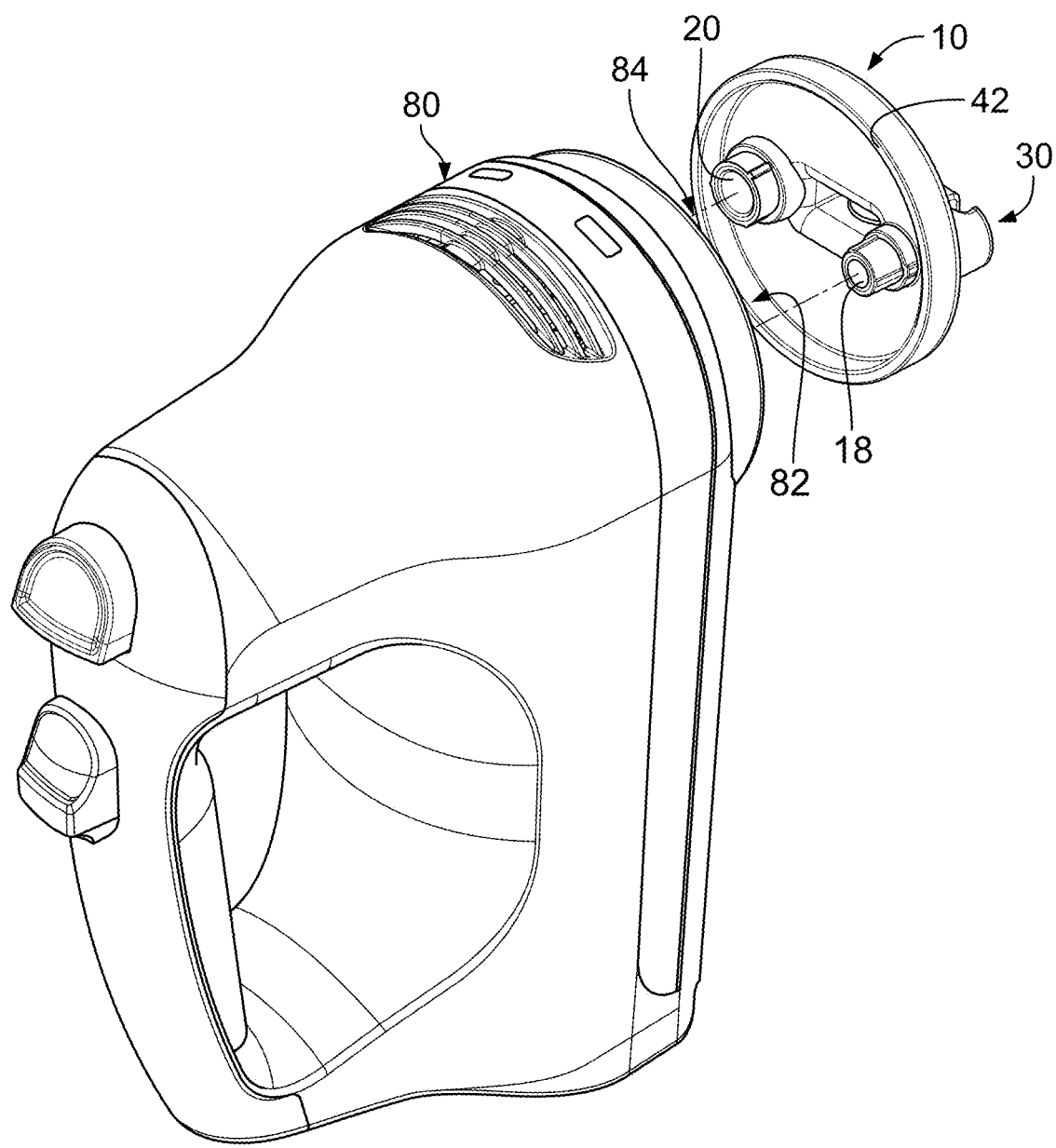
FIG. 4 is a back perspective assembly view showing alignment of the attachment holder for mounting on the hand mixer.
Figure 5:
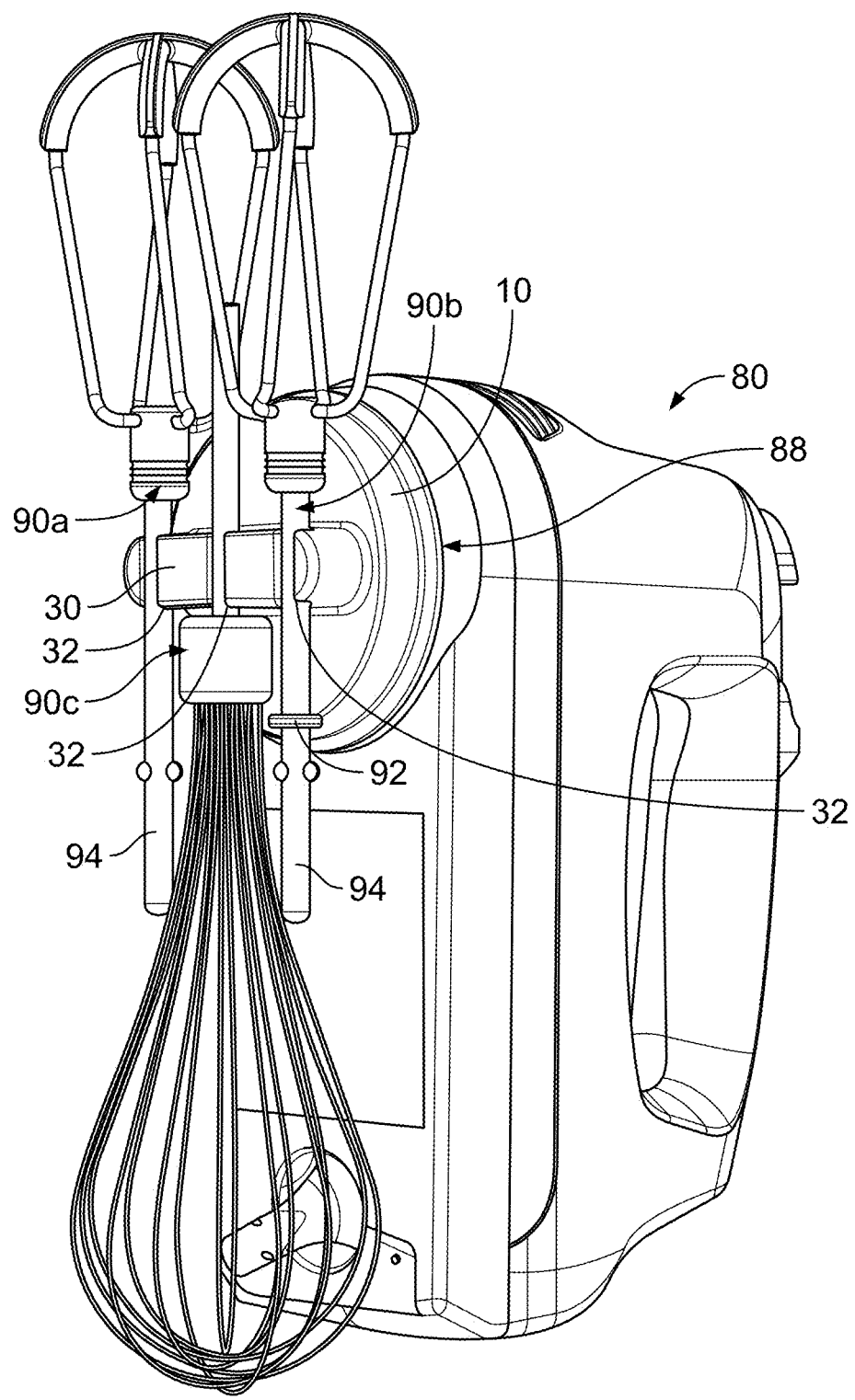
FIG. 5 is a front perspective view of the attachment holder mounted on a hand mixer and having a plurality of implement attachments retained thereon.

As shown in FIGS. 3-5, the first and second mounting projections 18,20 can be configured for engagement with respective first and second attachment hubs 82,84 of the hand mixer 80 to retain the attachment holder 10 on the hand mixer 80. This arrangement allows the attachment holder 10 to be used to retain various implement attachments 90 with the hand mixer 80, which the mixer 80 is being stored or is otherwise not in use, as shown in FIG. 5. More particularly, the first and second attachment hubs 82 and 84 can be exposed at a face 86 of the hand mixer 80 and can be provided with various implement attachments 90 that are selectively connectable with the first and second attachment hubs 82,84. It is noted that the depicted hand mixer 80 and implement attachments 90 are exemplary only and that the attachment holder 10 described herein can be used or can be configured for use, in accordance with the principles discussed herein, with other hand mixers 80 and/or implement attachments that may have some variations in their configuration, shape, etc.

Figure 6:
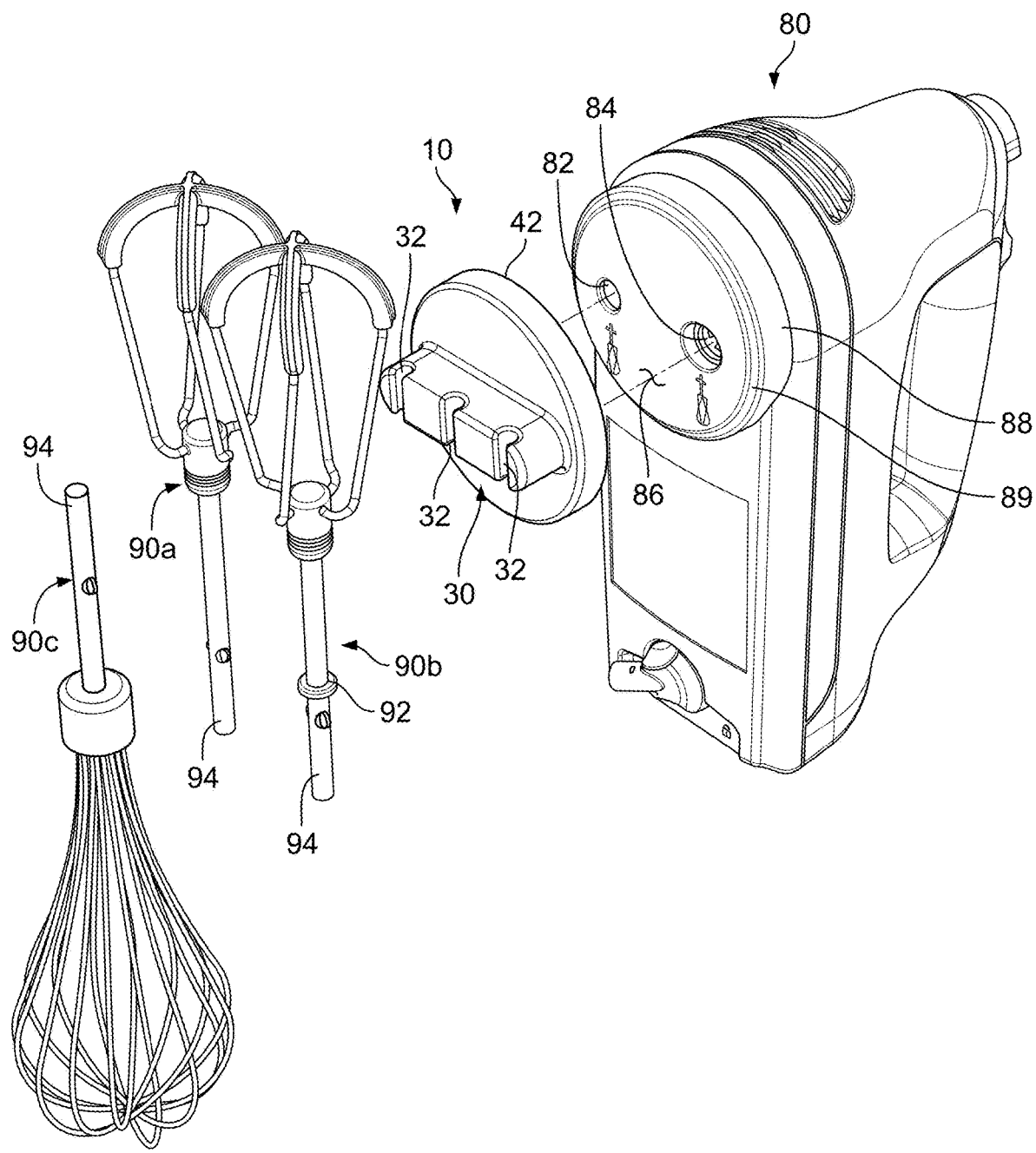
FIG. 6 is a front perspective assembly view showing alignment of the implement attachments with the attachment holder for mounting on the hand mixer.
Figure 7:
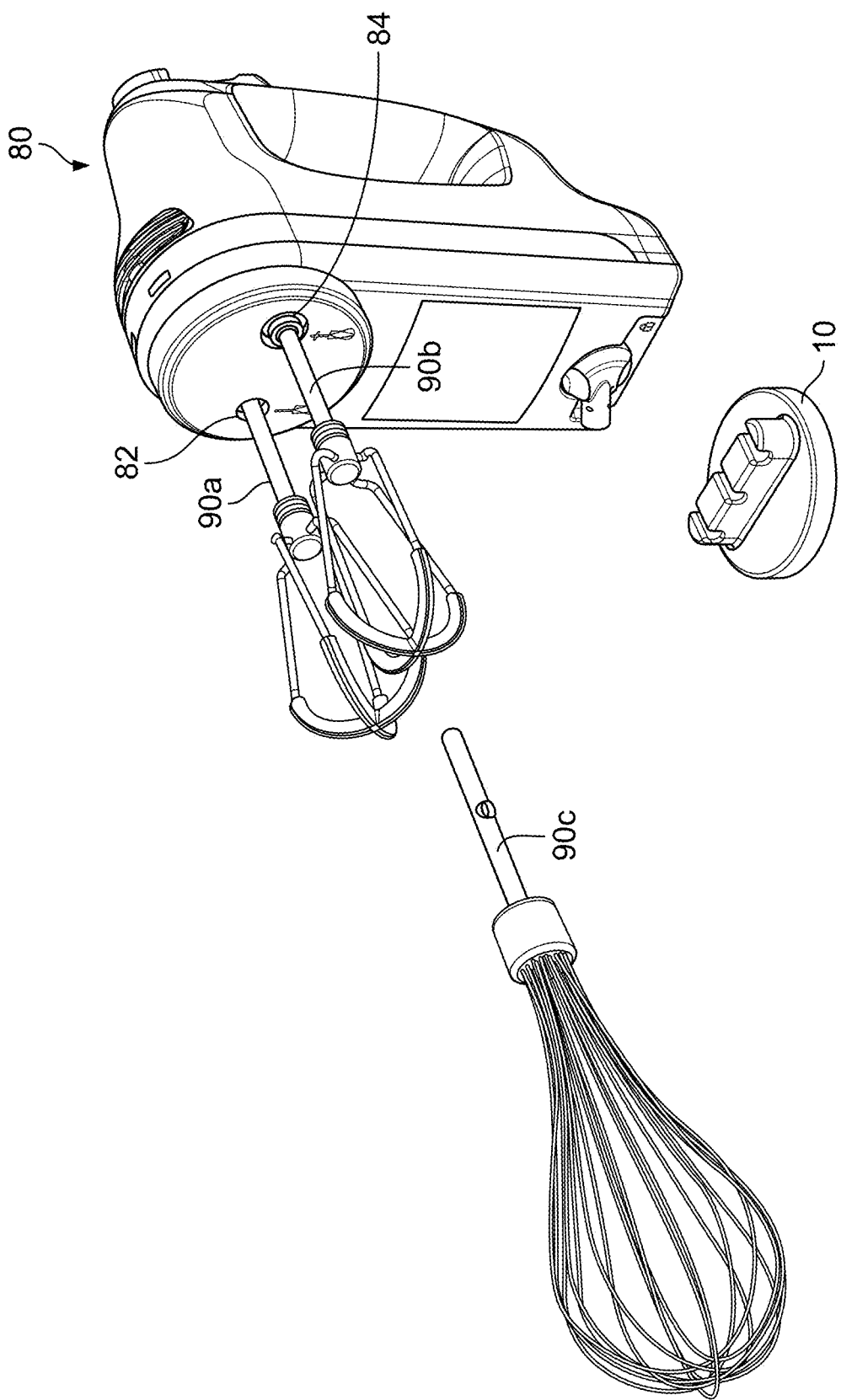
FIG. 7 is a front perspective assembly view showing two implement attachments assembled for use with the hand mixer.

In one aspect, the hand mixer 80 and implement attachments 90 can be included in a kit that can further include the above-described implement attachment holder 10. The attachment channels within the device retention projection 30 are, accordingly, configured to receive three such implement attachments 90 when the implement attachments 90 are not engaged with the first or second attachment hubs 82,84. In this manner, the implement attachments 90 are retained with the attachment holder 10 for retention with the hand mixer 80 by engagement of the first and second mounting projections 18, 20 with the first and second attachment hubs 82,84. As can be appreciated, the various implement attachments 90 can take on various known forms and configurations for mixing or processing various food items or ingredients in various ways. In particular, as shown in FIGS. 5-7, specific implementations of the attachment and the related kit can include a pair of beater attachments 90a and 90b that are configured to work in tandem with both beater attachments 90a and 90b received in both attachment hubs 82,84, respectively.

Additionally, an attachment can be provided in the form of a whisk 90c that is configured to be used alone when received in the first attachment hub 82. In this manner, at least two of the at least three implement attachments, in particular one of the beater attachments 90a and the whisk attachment 90c and/or a dough hook attachment, can be alternately connectable with the first attachment hub 82, which may be designated or configured as a primary hub 82 due, at least in part, to the direction in which it rotates (with the second attachment hub 84 rotating in a direction opposite to that of the first hub 82). In this respect, the first attachment hub 82 may rotate in the direction expected of or required for one or more the implement attachments 90 configured to be used alone (i.e., whisk attachment 90c and the dough hook attachment). The first attachment hub 82 can, thusly, be configured to be different than the second attachment hub 84 such that attachments 90 designated for use with the first hub 82 cannot be used with the second hub 84, including by reduction of the opening size of the first hub 82 in comparison with the second hub 84 or the like.

The body 12 can be configured to contact a face 86 of the hand mixer 80 that surrounds the first and second attachment hubs 82,84 when the attachment holder 10 is retained on the hand mixer 80, which may provide stability for the attachment holder 10 when assembled with the hand mixer 80. In the example shown in FIGS. 3 and 4, as well as the cross-section view of FIG. 8, the face 86 of the hand mixer 80 can be defined on a generally circular hub body 88 that extends outwardly (downwardly, during use) from the hand mixer 80. In this manner, the body 12 of the attachment holder 10 can define a similar, generally circular shape that mutually engages with the circular face 86 of the hub body 88. As further shown, a ridge 89 can be defined within or at an edge of the face 86, and the body 12 can further define a circular rim 42 extending from an outer perimeter of the first surface 14 such that the circular rim 42 can extend over the ridge 89 to further stabilize or to augment the coupling of the attachment holder 10 on the hand mixer 80.

Figure 8:
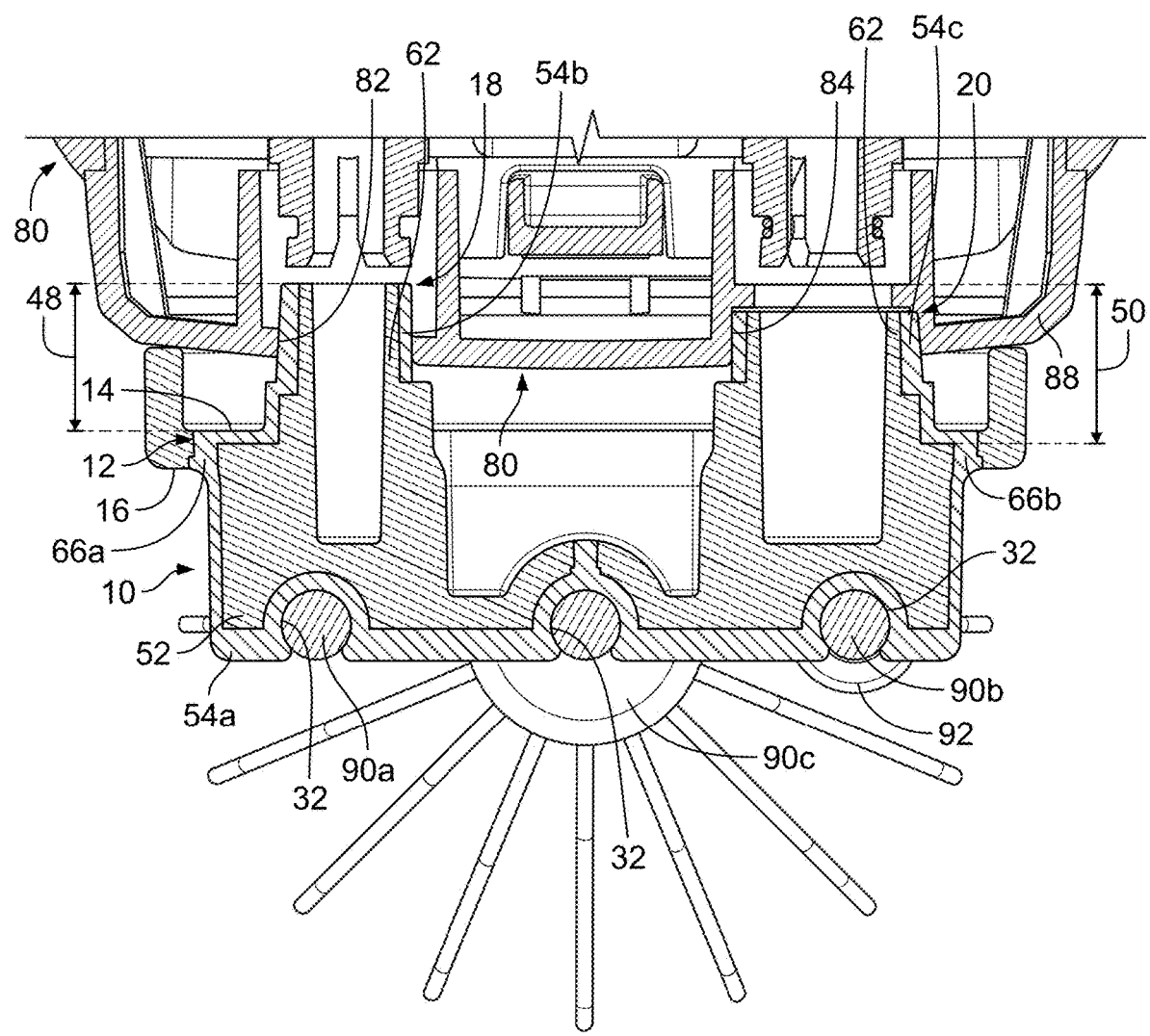
FIG. 8 is a cross section view of the attachment holder assembled with the hand mixer and retaining a plurality of implement attachments.

As further shown in FIGS. 3, 4, and 8, the first mounting projection 18 can define a width 44 that is less than a width 46 of the second mounting projection 20. In one implementation, the second mounting projection 20 can also extend from the first surface 14 of the body 12 to a distance 50 that is less than a corresponding distance 48 of the first mounting projection 18. This arrangement can be made to accommodate and properly interact with the depicted arrangement of the first hub 82 and second hub 84 of the example hand mixer 80 from the figures, in which the second hub 84, as discussed above, is larger than the first hub 82 to accommodate, for example a flange 92 included on one of the beater attachments 90b. In this and other implementations, the mounting projections 18 and 20 can be configured to interoperate with hubs 82,84 having geometry for selective operation or indication of desired operability with specific ones of the implement attachments 90.

Figure 9:
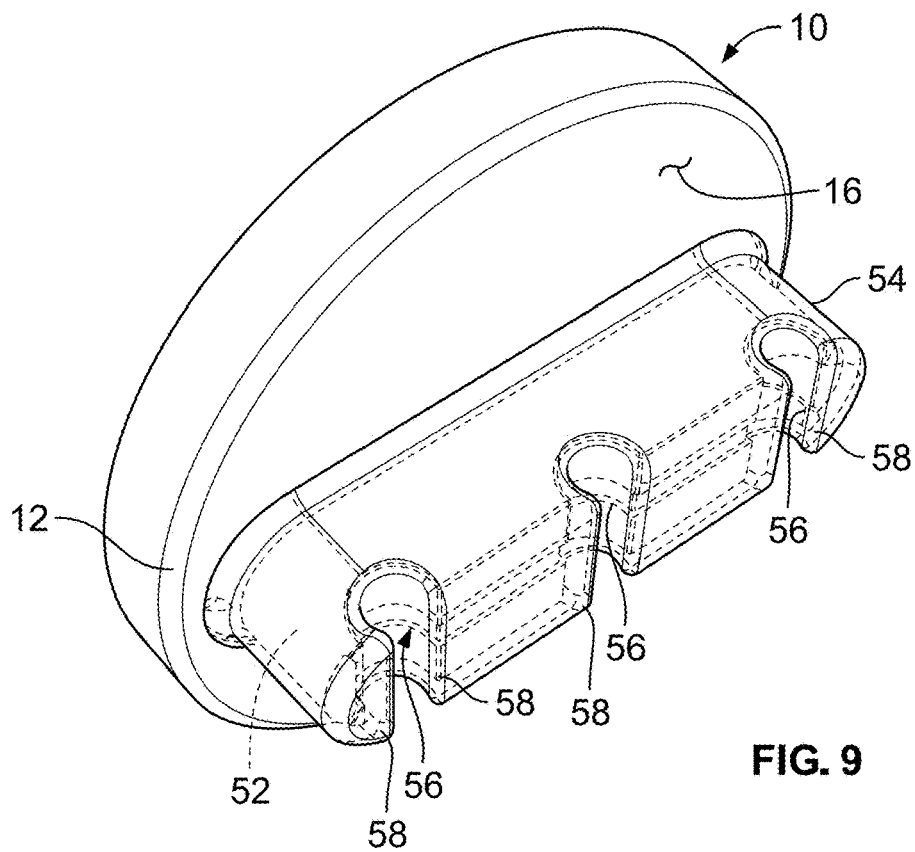
FIG. 9 is a front perspective view of the attachment holder showing a layered structure thereof.
Figure 10:
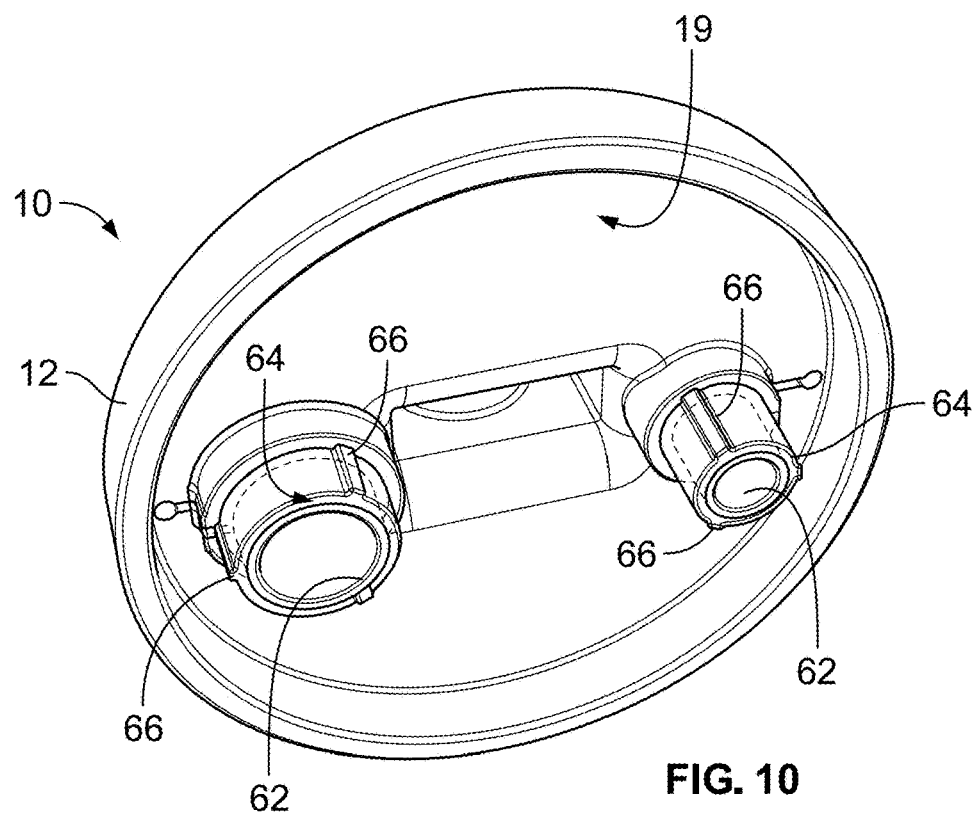
FIG. 10 is a rear perspective view of the attachment holder showing the layered structure thereof.

As further shown in FIG. 8, as well as FIGS. 9 and 10, the device retention projection 30 can include an inner layer 52 integral with the body 12 and an outer layer 54 coupled with and extending over the inner layer 52. The inner layer 52 can be of a polymeric material including various plastics or the like. In one aspect, the inner layer 52 can be of a relatively flexible polymer material such as nylon, polyethylene (PETE), polystyrene (PS) or the like. The outer layer 54 can be of a relatively softer, compressible polymer material including thermoplastic elastomer or the like. In one aspect, the inclusion of the outer layer 54 over the inner layer 52 of a first material having a first hardness, the outer layer 54 having a second hardness that is less than the first hardness, can make it easier for a user to assemble the attachments 90 with the retention channels 32 within the retention projection 30. In this respect, the outer layer 54 can line the retention channels 32 such that the retention channels 32 can be somewhat undersized relative to the stems 94 of the implement attachments 90 received therein (e.g., by about 10%) such that the outer layer 54 is compressed when the respective implement attachments 90 are received within the attachment channels 32. In this manner, the outer layer 54 lines at least interior portions 56 of the attachment channels 32. Additionally, the outer layer 54 can extend over the upper edges 58 of the attachment channels 32 where the attachment channels 32 meet the face 36 of the device retention projection 30. The outer layer 54 can be thicker over the edges 58 than within the inner portions 56 to provide a snap or press-fit engagement of the stems 94 by compression and extension of the outer layer 54 during assembly of the stems 94 into the interior portions 56. As shown in FIGS. 8-10, the outer layer 54 can extend over the entire outside of the device retention projection 30 to contact the second surface 16 of the body 12.

To achieve the layered structure of attachment holder 10 described above and shown in FIGS. 8-10, the outer layer 54 can be insert injection molded over the inner layer 52, which may be injection molded alone prior to being over-molded with the outer layer 54. Alternatively, the body 12 can be made by a dual-shot injection molding process such that the inner layer 52 and outer layer 54 are formed in a single operation. As shown in FIGS. 8 and 10, the inner layer 52 can further define respective inner portions 60,62 of the first and second mounting projections 18,20 such that the inner portions 60,62 extend integral with the body 12. Further, the outer layer 54 can additionally extend at least partially over the inner portions 60 of the mounting projections. In this manner, the inner portions 60,62 can provide generally rigid support to define and generally maintain the shape of the mounting projections 18,20. The outer layer 54 can extend over the inner portions 60,62 to define outer sleeves 64 that extend over the inner portions 60,62, the sleeves 64 having ribs 66 that extend further outwardly therefrom at spaced-apart intervals around the sleeves 64. In this manner, the outer layer 54 can define a compressible interface for engagement between the mounting projections 18,20 and the corresponding hubs 82,84 to provide a press-fit arrangement with an added degree of grip facilitated by the compression and tactile quality of the outer layer 54 defining the sleeves 64 and ribs 66. As shown, a first portion 54a of the outer layer 54 that extends over the inner layer 52 along the device retention projection 30 can connect with a second portion 54b of the outer layer 54 that extends over the inner portion 60 of the first mounting projection 18 and a third portion 54c of the outer layer 54 that extends over the second mounting projection 20 through respective channels 66a,66b defined through the body 12. This arrangement can further the adhesion/attachment of the outer layer 54 with the inner layer 52 and/or can facilitate injection molding of the outer layer 54 over the inner layer 52.

According to another aspect, a method for operating the hand mixer 80 described herein can include removing the implement attachment holder 10 from the hand mixer 80, including by withdrawal of the first and second mounting projections 18 and 20 from the attachment hubs 82 and 84 of the hand mixer 80, within which the mounting projections 18 and 20 are initially received. As discussed above, the implement attachment holder 10 can define at least three attachment channels 32 at spaced-apart locations along the mounting projection 30 and, at least initially, respectively retaining at least three implement attachments 90 that are selectively connectable with the first and second attachment hubs 82 and 84. The method can further include removing at least one of the implement attachments 90 from the implement attachment holder 10 and assembling the at least one of the implement attachments 90 with at least the first attachment hub 82 of the hand mixer 80. In this respect it is noted that at least the implement attachment 90 that is desired for use can be removed from the attachment holder 10 before or after removal of the same from the hand mixer 80, at the preference of the user.

The invention disclosed herein is further summarized in the following paragraphs and is further characterized by combinations of any and all of the various aspects described therein.

According to another aspect of the present disclosure, an implement attachment holder for a hand mixer includes a body defining opposed first and second surfaces and first and second mounting projections coupled with the body and extending away from the first surface of the body at respective first and second locations spaced apart at a first distance along a first direction. The attachment holder further includes a device retention projection extending away from the second surface of the body and partially along the first surface to at least partially overlie the first and second locations from which the first and second mounting projections extend. The device retention projection further defines at least three attachment channels extending in a second direction normal to the first direction at spaced-apart locations along the device retention projection. The attachment channels are open on a face of the device retention projection and on first and second parallel long sides of the device retention projection that extend between the face and the second surface of the body.

The first and second mounting projections can be configured for engagement with respective first and second attachment hubs of the hand mixer to retain the attachment holder on the hand mixer.

The first surface of the body can be configured to contact a face of the hand mixer surrounding the first and second attachment hubs when the attachment holder is retained on the hand mixer.

The first surface of the body can define a generally circular shape, the body can further define a circular rim extending from an outer perimeter of the first surface of the body, and the circular rim can extend over an edge of a hub body of the hand mixer when the attachment holder is retained on the hand mixer.

The first mounting projection can define a width that is less than a width of the second mounting projection.

The device retention projection can include an inner layer integral with the body and of a first material having a first hardness and an outer layer coupled with and extending over the inner layer, the outer layer having a second hardness that is less than the first hardness.

The inner layer can be of a plastic material, and the outer layer can be of an elastomer material injection molded over the inner layer.

The inner layer integral with the body can further define inner portions of the mounting projections, and the outer layer can further extend at least partially over the inner portions of the mounting projections.

A first portion of the outer layer that extends over the inner layer of the device retention projection can connect with a second portion of the outer layer that extends over the first mounting projection and a third portion of the outer layer that extends over the second mounting projection through respective channels defined through the body.

The outer layer can line interior portions of the attachment channels.

According to yet another aspect, a kit includes a hand mixer having first and second attachment hubs exposed at a face of the hand mixer and at least three implement attachments selectively connectable with the first and second attachment hubs. The kit further includes an implement attachment holder having a body defining opposed first and second surfaces and first and second mounting projections coupled with the body and extending away from the first surface of the body at respective first and second locations spaced apart at a first distance along a first direction configured for engagement with respective first and second attachment hubs of the hand mixer to retain the attachment holder on the hand mixer. The attachment holder further has a device retention projection extending away from the second surface of the body and partially along the first surface. The device retention projection further defines at least three attachment channels extending in a second direction normal to the first direction at spaced-apart locations along the device retention projection. The attachment channels are open on a face of the device retention projection and on first and second parallel long sides of the device retention projection that extend between the face and the second surface of the body. The attachment channels are configured to receive three of the at least three implement attachments when not engaged with the first or second attachment hubs for retention with the hand mixer by engagement of the first and second mounting projections with the first and second attachment hubs.

At least two of the at least three implement attachments can be alternately connectable with the first attachment hub.

The at least three implement attachments can comprise a pair of beater attachments and a whisk attachment.

The at least three implement attachments can further comprise a dough hook attachment.

The device retention projection can extend partially along the first surface to at least partially overlie the first and second locations from which the first and second mounting projections extend.

The first surface of the body can define a generally circular shape, the body can further define a circular rim extending from an outer perimeter of the first surface of the body, and the circular rim can extend over an edge of a hub body of the hand mixer when the attachment holder is retained on the hand mixer.

The device retention projection can include an inner layer integral with the body and of a first material having a first hardness and an outer layer coupled with and extending over the inner layer, and the outer layer can have a second hardness that is less than the first hardness and can at least line interior portions of the attachment channels.

The inner layer integral with the body can further define inner portions of the mounting projections, and the outer layer can further extend at least partially over the inner portions of the mounting projections.

A first portion of the outer layer that extends over the inner layer of the device retention projection can connect with a second portion of the outer layer that extends over the first mounting projection and a third portion of the outer layer that extends over the second mounting projection through respective channels defined through the body.

According to yet another aspect, a method for operating a hand mixer can include removing an implement attachment holder from the hand mixer by removing first and second mounting projections coupled with a body of the attachment holder and extending away from a first surface of the body from engagement with respective first and second attachment hubs of the hand mixer. The implement attachment holder defines at least three attachment channels extending in a second direction normal to the first direction at spaced-apart locations along a mounting projection and respectively retaining at least three implement attachments selectively connectable with the first and second attachment hubs. The method can further include removing at least one of the implement attachments from the implement attachment holder and assembling the at least one of the implement attachments with at least the first attachment hub of the hand mixer.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An implement attachment holder for a hand mixer, comprising:
    a body defining opposed first and second surfaces;
    first and second mounting projections coupled with the body and extending away from the first surface of the body at respective first and second locations spaced apart at a first distance along a first direction;
    a device retention projection extending away from the second surface of the body and partially along the first surface to at least partially overlie the first and second locations from which the first and second mounting projections extend, the device retention projection further defining at least three attachment channels extending in a second direction normal to the first direction at spaced-apart locations along the device retention projection, the attachment channels being open on a face of the device retention projection and on first and second parallel long sides of the device retention projection that extend between the face and the second surface of the body.

2. The implement attachment holder of claim 1, wherein the first and second mounting projections are configured for engagement with respective first and second attachment hubs of the hand mixer to retain the attachment holder on the hand mixer.

3. The implement attachment holder of claim 2, wherein the first surface of the body is configured to contact a face of the hand mixer surrounding the first and second attachment hubs when the attachment holder is retained on the hand mixer.

4. The implement attachment holder of claim 2, wherein the first surface of the body defines a generally circular shape, the body further defining a circular rim extending from an outer perimeter of the first surface of the body, the circular rim extending over an edge of a hub body of the hand mixer when the attachment holder is retained on the hand mixer.

5. The implement attachment holder of claim 2, wherein the first mounting projection defines a width that is less than a width of the second mounting projection.

6. The implement attachment holder of claim 1, wherein the device retention projection includes an inner layer integral with the body and of a first material having a first hardness and an outer layer coupled with and extending over the inner layer, the outer layer having a second hardness that is less than the first hardness.

7. The implement attachment holder of claim 6, wherein:
    the inner layer is of a plastic material; and
    the outer layer is of an elastomer material injection molded over the inner layer.

8. The implement attachment holder of claim 6, wherein the inner layer integral with the body further defines inner portions of the mounting projections, the outer layer further extending at least partially over the inner portions of the mounting projections.

9. The implement attachment holder of claim 8, wherein a first portion of the outer layer that extends over the inner layer of the device retention projection connects with a second portion of the outer layer that extends over the first mounting projection and a third portion of the outer layer that extends over the second mounting projection through respective channels defined through the body.

10. The implement attachment holder of claim 6, wherein the outer layer lines interior portions of the attachment channels.

11. A kit, comprising:
    a hand mixer including first and second attachment hubs exposed at a face of the hand mixer;
    at least three implement attachments selectively connectable with the first and second attachment hubs;
    an implement attachment holder, including:
        a body defining opposed first and second surfaces;
        first and second mounting projections coupled with the body and extending away from the first surface of the body at respective first and second locations spaced apart at a first distance along a first direction configured for respective engagement with the first and second attachment hubs of the hand mixer to retain the attachment holder on the hand mixer;
        a device retention projection extending away from the second surface of the body and partially along the first surface, the device retention projection further defining at least three attachment channels extending in a second direction normal to the first direction at spaced-apart locations along the device retention projection, the attachment channels being open on the face of the device retention projection and on first and second parallel long sides of the device retention projection that extend between the face and the second surface of the body, the attachment channels being configured to receive three of the at least three implement attachments when not engaged with the first or second attachment hubs for retention with the hand mixer by engagement of the first and second mounting projections with the first and second attachment hubs.

12. The kit of claim 11, wherein at least two of the at least three implement attachments are alternately connectable with the first attachment hub.

13. The kit of claim 11, wherein the at least three implement attachments comprise a pair of beater attachments and a whisk attachment.

14. The kit of claim 13, wherein the at least three implement attachments further comprise a dough hook attachment.

15. The kit of claim 11, wherein the device retention projection extends partially along the first surface to at least partially overlie the first and second locations from which the first and second mounting projections extend.

16. The kit of claim 11, wherein the first surface of the body defines a generally circular shape, the body further defining a circular rim extending from an outer perimeter of the first surface of the body, the circular rim extending over an edge of a hub body of the hand mixer when the attachment holder is retained on the hand mixer.

17. The kit of claim 11, wherein the device retention projection includes an inner layer integral with the body and of a first material having a first hardness and an outer layer coupled with and extending over the inner layer, the outer layer having a second hardness that is less than the first hardness and at least lining interior portions of the attachment channels.

18. The kit of claim 17, wherein the inner layer integral with the body further defines inner portions of the mounting projections, the outer layer further extending at least partially over the inner portions of the mounting projections.

19. The kit of claim 18, wherein a first portion of the outer layer that extends over the inner layer of the device retention projection connects with a second portion of the outer layer that extends over the first mounting projection and a third portion of the outer layer that extends over the second mounting projection through respective channels defined through the body.

20. A method for operating a hand mixer, comprising:
removing an implement attachment holder from the hand mixer by removing first and second mounting projections coupled with a body of the attachment holder and extending away from a first surface of the body at respective first and second locations spaced apart at a first distance along a first direction from engagement with respective first and second attachment hubs of the hand mixer, the implement attachment holder defining at least three attachment channels extending in a second direction normal to the first direction at spaced-apart locations along a mounting projection, being open on a face of the device retention projection and on first and second parallel long sides of the device retention projection that extend between the face and the second surface of the body, and respectively retaining at least three implement attachments selectively connectable with the first and second attachment hubs;
removing at least one of the implement attachments from the implement attachment holder; and
assembling the at least one of the implement attachments with at least the first attachment hub of the hand mixer.

\* \* \* \* \*